(12) United States Patent
Sano

(10) Patent No.: US 8,171,913 B2
(45) Date of Patent: May 8, 2012

(54) INTAKE SYSTEM FOR INTERNAL COMBUSTION ENGINE

(75) Inventor: Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 285 days.

(21) Appl. No.: 12/618,068

(22) Filed: Nov. 13, 2009

(65) Prior Publication Data
US 2010/0122680 A1    May 20, 2010

(30) Foreign Application Priority Data

Nov. 20, 2008  (JP) ................................. 2008-296467

(51) Int. Cl.
*F02D 9/08* (2006.01)
*F02M 35/10* (2006.01)
(52) U.S. Cl. ................................. 123/337; 123/184.56
(58) Field of Classification Search ............. 123/184.21, 123/184.22, 184.38, 184.54, 184.56, 190.1, 123/190.2, 304–306, 308–309, 336, 337; 60/304, 305
See application file for complete search history.

(56) References Cited

U.S. PATENT DOCUMENTS

| | | | | |
|---|---|---|---|---|
| 1,440,592 A * | 1/1923 | Gile | .......................... | 123/184.56 |
| 6,874,465 B2 | 4/2005 | Arimatsu et al. | | |
| 7,128,050 B1 | 10/2006 | Abe | | |
| 7,134,422 B2 | 11/2006 | Yanagibashi et al. | | |
| 7,900,595 B2 | 3/2011 | Abe et al. | | |
| 2004/0244767 A1* | 12/2004 | Nishii et al. | ................... | 123/308 |
| 2006/0048738 A1* | 3/2006 | Isaji et al. | ................ | 123/184.56 |
| 2006/0048739 A1* | 3/2006 | Isaji et al. | ................ | 123/184.56 |
| 2010/0294228 A1* | 11/2010 | Kameda et al. | .......... | 123/184.56 |

FOREIGN PATENT DOCUMENTS

| | | |
|---|---|---|
| JP | 2004-036598 | 2/2004 |
| JP | 2004-124836 | 4/2004 |
| JP | 2004-526098 | 8/2004 |
| JP | 2005-105956 | 4/2005 |
| JP | 2007-071163 | 3/2007 |
| JP | 2008-025363 | 2/2008 |

* cited by examiner

*Primary Examiner* — Willis Wolfe, Jr.
*Assistant Examiner* — Johnny Hoang
(74) *Attorney, Agent, or Firm* — Nixon & Vanderhye PC

(57) ABSTRACT

An intake system for an engine includes a duct defining an intake passage therein, and a cantilevered valve including a valve main body opening/closing the intake passage, a shaft supporting the body, and a valve extension portion. The duct includes a reduced passage portion between the duct and the body when the body is in a fully closed position, a recess accommodating the body and the extension portion when the body is fully opened, and a pressure introduction passage formed between the duct and the body when the body is fully closed, and communicating with a space between the body and the extension portion when the body is fully closed. The extension portion includes a sealing part. The duct and the sealing part define a clearance therebetween when the body is fully closed. The clearance has a smaller sectional area than the reduced passage portion.

9 Claims, 8 Drawing Sheets

FIG. 10A
PRIOR ART
FIG. 10B
PRIOR ART
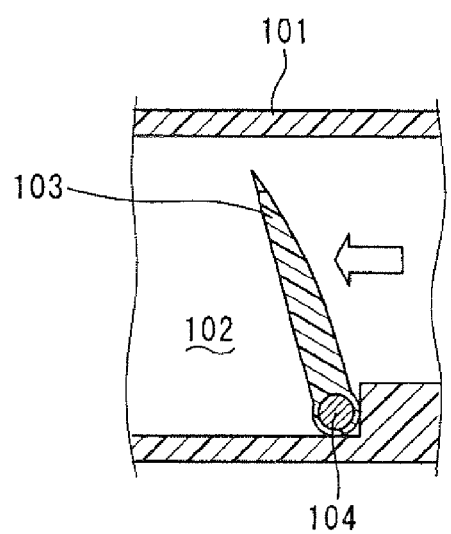
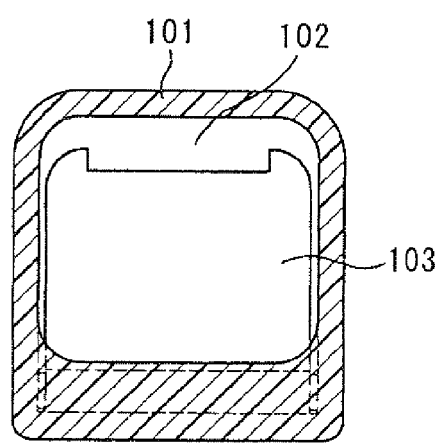

INTAKE SYSTEM FOR INTERNAL COMBUSTION ENGINE

CROSS REFERENCE TO RELATED APPLICATION

This application is based on and incorporates herein by reference Japanese Patent Application No. 2008-296467 filed on Nov. 20, 2008.

BACKGROUND OF THE INVENTION

1. Field of the Invention

The present invention relates to an intake system for an internal combustion engine having a cantilevered valve for opening and closing an intake passage that communicates with an intake port of the engine.

2. Description of Related Art

Conventionally, an intake system of an internal combustion engine that curbs dispersion of combustion by stabilizing generation of a swirling flow (tumble flow) in a combustion chamber of the engine by reducing a passage sectional area of an intake passage, through which intake air is supplied to the combustion chamber, is proposed (see, e.g., JP-A-2008-25363). As shown in FIG. 10A and FIG. 10B, this intake system of the engine includes an intake manifold 101 of the engine, an intake air flow control valve for opening and closing an intake passage 102 formed in the intake manifold 101, and a rotatable shaft 104 that supports a valve 103 which is a valve body of the intake air flow control valve.

A cantilevered valve which offsets a centre position of the rotatable shaft 104 (rotation center position of the valve 103) with respect to a centre position of the valve 103 is used as the valve body of the intake air flow control valve. An actuator that includes, for example, a motor for driving the rotatable shaft 104 of the valve 103 and a return spring for urging the valve 103 to be in a fully open state (fully open position) is connected to the intake air flow control valve. The motor is configured such that opening and closing timing of the valve 103, for example, is controlled by an engine control unit (ECU). To fully close the valve 103 of the intake air flow control valve, the rotatable shaft 104 is driven using driving torque of the motor through the supply of electric power to the motor so that a degree of opening of the valve 103 is in a fully closed state (fully closed position). To fully open the valve 103 of the intake air flow control valve, by stopping the supply of electric power to the motor, the return spring urges the valve 103 using spring force of the return spring such that the degree of opening of the valve 103 is in the fully open state (fully open position).

However, the cantilevered valve which offsets the centre position of the rotatable shaft 104 with respect to the centre position of the valve 103, is employed for the intake air flow control valve described in JP-A-2008-25363. In this case, due to differential pressure between upstream and downstream sides of the valve 103 generated when the valve 103 of the intake air flow control valve is fully closed, rotary torque (bending moment) in a direction of valve opening operation with the rotatable shaft 104 of the intake air flow control valve as its center, is applied to the valve 103. Accordingly, maintenance accuracy of the opening degree in maintaining the valve 103 of the intake air flow control valve in the fully closed state (fully closed position) deteriorates. As a result, the motor requires excessive holding torque to maintain the valve 103 of the intake air flow control valve in the fully closed state (fully closed position). Therefore, defects such as upsizing of the actuator including the motor and increase in power consumption of the motor are caused.

In addition, the valve 103 of the intake air flow control valve is disposed normally in the intake passage 102 to whose interior portion large negative pressure of intake air and small atmospheric pressure are repeatedly applied in accordance with ascent and descent of a piston of the engine and opening and closing of an inlet valve. Thus, pressure of intake air is applied in a pulsatile fashion to the valve 103 disposed in the intake passage 102. When the pressure of intake air is applied in a pulsatile fashion in the above-described manner, the valve 103 flaps in the intake passage 102. Accordingly, it is difficult to maintain the valve 103 of the intake air flow control valve in the fully closed state (fully closed position) or to maintain the valve 103 of the intake air flow control valve in the fully open state (fully open position), and the opening degree maintenance accuracy in maintaining the valve 103 of the intake air flow control valve in the fully open position and in the fully closed position deteriorates. As a result, the generation of a swirling flow (tumble flow) in a combustion chamber of the engine becomes unstable. Consequently, an effect of improving combustion efficiency of the engine and a fuel efficiency improvement effect by the stabilization of combustion are reduced.

SUMMARY OF THE INVENTION

The present invention addresses at least one of the above disadvantages.

According to the present invention, there is provided an intake system for an internal combustion engine. The intake system includes a duct and a cantilevered valve. The duct defines an intake passage inside the duct. Intake air is supplied to a combustion chamber of the engine through the intake passage. The cantilevered valve includes a plate-like valve main body, a rotatable shaft and a valve extension portion. The plate-like valve main body opens and closes the intake passage of the duct. The rotatable shaft supports the valve main body. The valve extension portion extends from the valve main body in a valve opening direction of the valve main body. The duct includes a reduced passage portion, an accommodating recess and a pressure introduction passage. The reduced passage portion is formed between an inner wall of the duct and the valve main body at least when the valve main body is held in a valve fully closed position. The accommodating recess accommodates the valve main body and the valve extension portion at least when the valve main body fully opens the intake passage. The pressure introduction passage is formed between an inner wall of the duct and the valve main body at least when the valve main body fully closes the intake passage, and communicates with a space between the valve main body and the valve extension portion at least when the valve main body fully closes the intake passage. The valve extension portion includes a sealing part. The duct and the sealing part define a clearance therebetween at least when the valve main body fully closes the intake passage. The clearance has a smaller flow passage sectional area than the reduced passage portion.

BRIEF DESCRIPTION OF THE DRAWINGS

The invention, together with additional objectives, features and advantages thereof, will be best understood from the following description, the appended claims and the accompanying drawings in which:

FIG. 10A is a cross-sectional view illustrating a previously proposed valve unit; and FIG. 10B is a cross-sectional view illustrating the previously proposed valve unit.

DETAILED DESCRIPTION OF THE INVENTION

Figure 1:
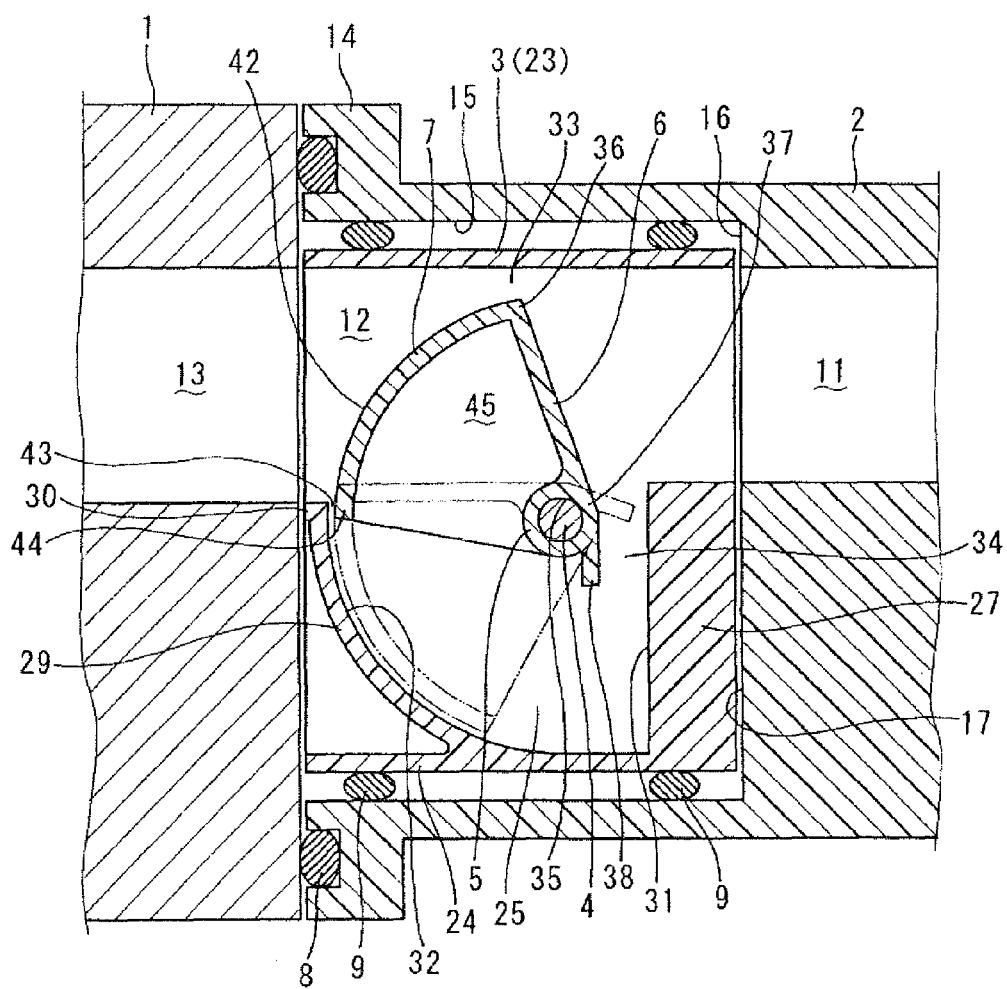
FIG. 1 is a cross-sectional view illustrating an intake system of an internal combustion engine in accordance with a first embodiment of the invention.
Figure 2:
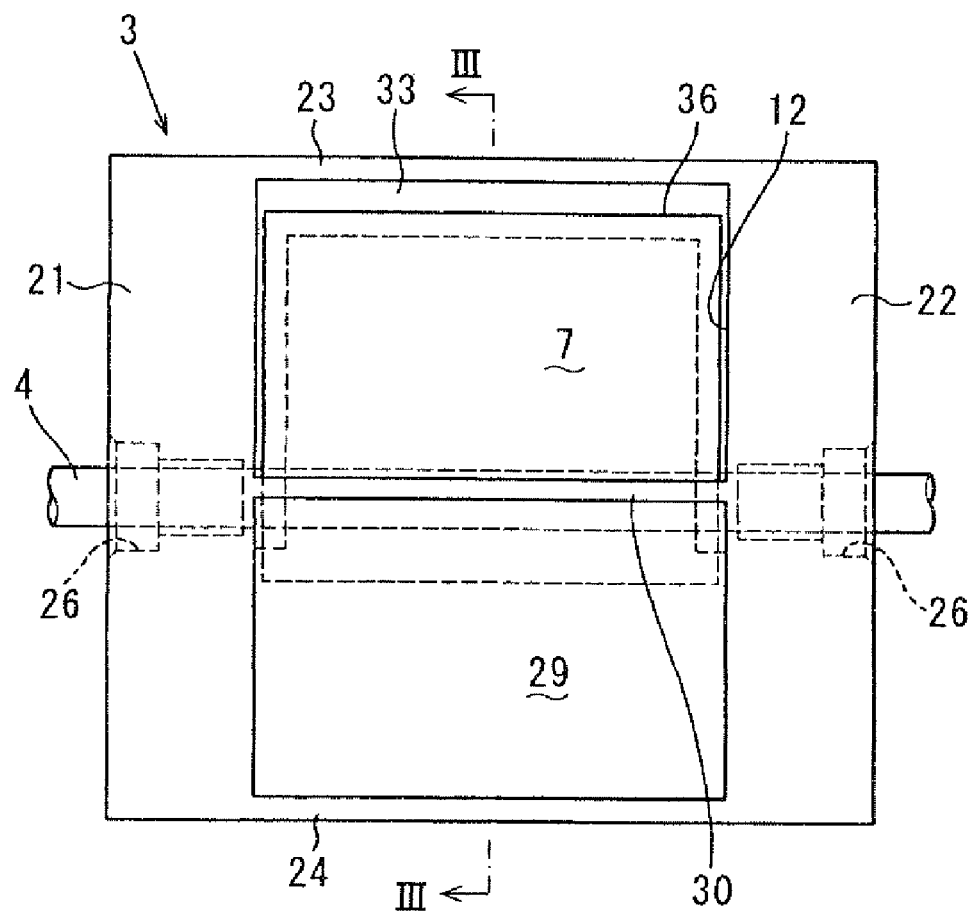
FIG. 2 is a front view illustrating a TCV (valve unit) in accordance with the first embodiment.
Figure 3:
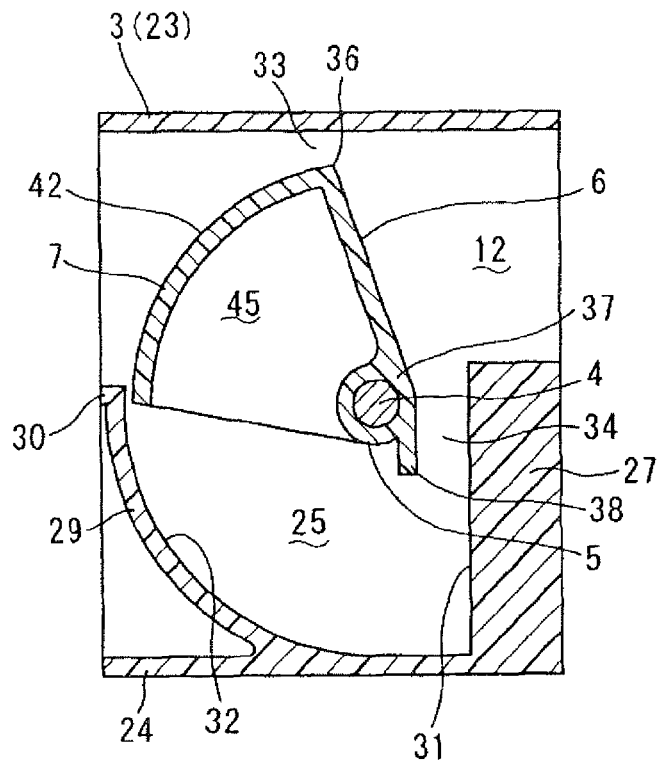
FIG. 3 is a cross-sectional view taken along a line in FIG. 2 in accordance with the first embodiment.
Figure 4:
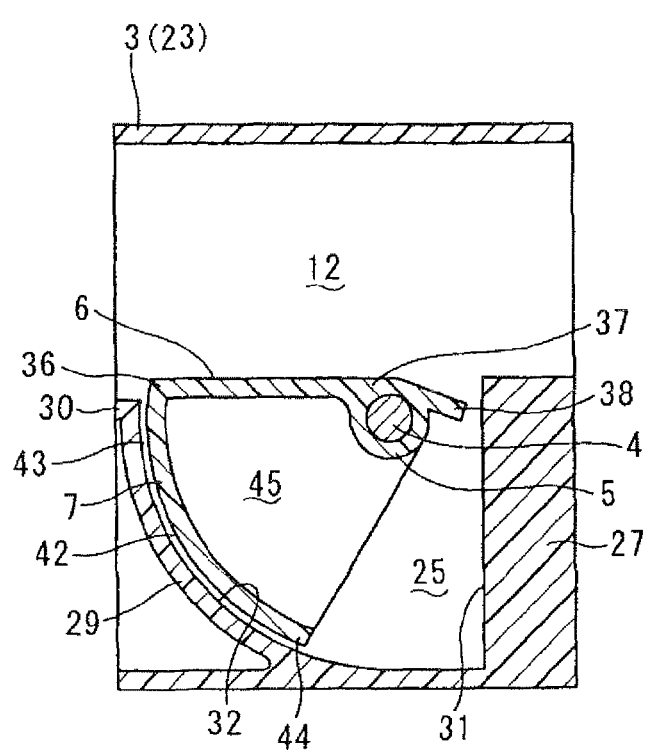
FIG. 4 is a cross-sectional view illustrating the TCV in accordance with the first embodiment.

Embodiments of the invention achieve the objective of improving opening degree maintenance accuracy in maintaining a valve main body of a cantilevered valve in a fully closed state or in a fully open state and the objective of improving combustion efficiency of the engine or improving fuel efficiency through stabilization of combustion by stabilizing generation of a swirling flow in a combustion chamber of the engine or by intensifying the swirling flow in the combustion chamber of the engine, by providing a valve extension portion that extends in a direction from the valve main body to a rear side in a valve closing direction for the cantilevered valve, by forming a sealing part on the valve extension portion, a clearance that has a smaller passage sectional area than a reduced portion being defined between the sealing part and a duct at least when the valve main body is fully closed, by providing a pressure introduction passage for the duct, the pressure introduction passage being defined between the duct and the valve main body at least when the valve main body is fully closed, and by forming the pressure introduction passage such that the pressure introduction passage communicates with a space formed between the valve main body and the valve extension portion at least when the valve main body is fully closed.

First Embodiment

Constitution of a first embodiment of the invention is described below with reference to FIG. 1 to FIG. 4.

An intake system for an internal combustion engine according to the present embodiment includes two or more valve units that are used as an intake air flow control valve (tumble flow control valve) accommodated in an intake pipe (air intake duct) of the engine having cylinders. This valve unit (TCV) includes a housing 3 that is formed in a shape of a rectangular cylinder accommodated in an intake manifold 2, which is joined airtightly to a cylinder head 1 of the engine, and a cantilevered valve that generates a swirling flow (intake air vortical flow or tumble flow) in a longitudinal direction in a combustion chamber for each cylinder of the engine. The two or more cantilevered valves include an axial direction part (rotatable shaft) 5 that is formed in such a cylindrical shape as to surround the shaft 4 straightly extending in a rotation axis direction, a valve main body (valve plate) 6 formed in a shape of a plate (a linear shape in cross section) that opens and closes an air flow passage (separate intake passages 11, 12 and a intake port 13) communicating with the combustion chamber for each cylinder of the engine, and a valve extension portion (separator plate) 7 that is formed in a shape of a plate (shape of a circular arc in cross section) extending in a shape of a circular arc from an end portion of the valve plate 6 on its opposite side from the axial direction part of the plate 6 to a backward side in a valve closing direction (opposite side from the valve closing direction (e.g., retard-angle side in the valve closing direction)). The cantilevered valve is employed as an intake air flow control valve for opening and closing the intake passages 11, 12 of the duct 2 by relatively rotating with respect to the duct 2.

Additionally, the intake manifold 2 is joined airtightly to a cylinder head 1 of the engine via one or more gaskets 8. Furthermore, each of the housings 3 of the valve units is elastically supported in a housing accommodating chamber of the intake manifold 2 via the two gaskets 9. Accordingly, by absorbing dimensional change of a sliding clearance for attachment in a radial direction based on a difference of coefficient of thermal expansion between the intake manifold 2 and the shaft 4 due to temperature change so as to reduce shaft sliding torque, a floating gasket structure that ensures high responsiveness of the valve plate 6 of each of the cantilevered valves is achieved.

The engine is a gasoline engine that generates engine output by heat energy obtained by combusting fuel/air mixture of clean intake air filtered through an air cleaner (air cleaner of the engine) and fuel injected from an injector in the combustion chamber of each cylinder. The engine includes a cylinder block having the cylinders (first to fourth cylinder) with the first cylinder to the fourth cylinder arranged in series in a cylinder arranging direction, and the cylinder head 1 having the intake ports 13 and exhaust ports. Each of the intake ports 13 connected independently to the respective combustion chambers of the cylinders of the engine is opened and closed by a poppet type intake valve. Each of the exhaust ports connected independently to the respective combustion chambers of the cylinders of the engine is opened and closed by a poppet type exhaust valve. A spark plug is attached to the cylinder head 1 of the engine such that its front end portion is exposed to the inside of the combustion chamber for each cylinder. An injector (electromagnetic fuel injection valve) for injecting fuel into each intake port 13 with optimal timing is attached to the cylinder head 1.

The intake pipe (air intake duct) for conducting intake air into the combustion chamber for each cylinder of the engine, and an exhaust pipe (exhaust duct) for discharging exhaust gas flowing out of the combustion chamber for each cylinder of the engine to the outside through an exhaust emission control device, are connected to the cylinder head 1 of the engine. Air flow passage (separate intake passages 11, 12) for conducting clean outside air filtered through the air cleaner into the combustion chamber for each cylinder of the engine via a throttle body of an electronic throttle device, a surge tank, and the intake manifold 2 is formed inside the air intake duct. The air intake duct includes an air cleaner case, an air cleaner hose (or intake pipe), the throttle body and the intake manifold 2.

Four combustion chambers are formed in the cylinder block of the engine in the cylinder arranging direction. The piston connected to a crankshaft via a connecting rod is held slidably in its sliding direction in a cylinder bore formed in each cylinder of the cylinder block. The cylinder head 1 of the engine includes a coupling end face (fastening surface) for fastening the intake manifold 2 using a fastening bolt, for example. One or more (number of cylinders) gaskets 8 are attached between the coupling end face of the cylinder head 1 and a coupling end face (fastening surface) formed on a flange 14 of the intake manifold 2.

The intake manifold 2 of the present embodiment is made up of two or more parts, and is a surge tank integral-type intake manifold having a surge tank that reduces pressure pulsation of intake air and intake air branch pipes connected to outlets of the surge tank. The two or more parts are all made of synthetic resin. The intake manifold 2 includes the intake air branch pipes. The separate intake passages 11 each of which has a rectangular shape in cross section, and housing accommodating chambers 15 each of which has a rectangular shape in cross section are formed inside each of the intake air branch pipes. The number of the passages 11 and the chambers 15 corresponds to the number of cylinders. The corresponding valve unit, in particular, the housing 3 is fitted and held in each of the housing accommodating chambers 15. Therefore, the intake manifold 2 serves as an intake introduction duct having the housings 3.

The intake manifold 2 includes a stepped surface 16 between an upper side wall surface (upper surface) of each separate intake passage 11 in a direction of gravitational force and an upper side wall surface (upper surface) of each housing accommodating chamber 15 in the direction of gravitational force. The intake manifold 2 includes a stepped surface 17 between a lower side wall surface (bottom surface or lower surface) of each separate intake passage 11 in the direction of gravitational force and a lower side wall surface (bottom surface or lower surface) of each housing accommodating chamber 15 in the direction of gravitational force. An actuator for driving each cantilevered valve of the valve units to open and close via the shaft 4 is provided for the intake manifold 2. The actuator includes an electric motor that generates driving force (driving torque) upon receiving supply of electric power and a power transmission device (e.g., gear speed reduction mechanism) that transmits driving torque of the electric motor to the shaft 4.

The electric motor for driving the cantilevered valves via the shaft 4 is electrically connected to a battery installed in a vehicle such as an automobile through a motor drive circuit that is electronically controlled by an engine control unit (hereinafter referred to as ECU). Each cantilevered valve of the valve units is fully closed using driving torque of the actuator, particularly the electric motor at the time of engine starting or at the time of idle operation. Therefore, when the engine is started or the engine is in idle operation, valve opening degrees of the valve units (TCV) are controlled so as to be in a state of a fully closed opening degree (valve fully closed position) (the valve units are driven in a fully closing direction). Each cantilevered valve of the valve units is fully opened using driving torque of the electric motor when the engine is in normal operation. Therefore, when the engine is in normal operation, valve opening degrees of the valve units (TCV) are controlled so as to be in a state of a fully opened opening degree (valve fully open position) (the valve units are driven in a fully opening direction). In addition, all the cantilevered valves may be urged in a direction of valve opening operation so as to be in the valve fully open position by urging force such as a spring incorporated in the actuator. When supply of electric power to the electric motor is stopped while the engine is stopped, each cantilevered valve of the valve units is returned to the valve fully open position (or a state of an intermediate opening degree (intermediate position) which is slightly closed relative to the valve fully open position) by urging force such as a spring.

The valve unit of the present embodiment includes two or more separate intake passages 12 for each housing 3, which are connected respectively to the separate intake passages 11 of the intake manifold 2 and connected respectively to the intake ports 13 of the cylinder head 1. The separate intake passage 12 having a rectangular shape in cross section is formed in each housing 3. These separate intake passages 12 are arranged on a downstream side of the respective separate intake passages 11 of the intake air branch pipes which constitute the intake manifold 2 in an intake air flow direction, and connected independently of each other to the combustion chambers for the cylinders of the engine through the respective intake ports 13 of the cylinder head 1. The valve unit is disposed in an engine compartment of a vehicle such as an automobile to serve as an intake air vortical flow generator for generating a swirling flow (intake air vortical flow or tumble flow) in the longitudinal direction in the combustion chamber for each cylinder of the engine by reducing passage sectional areas of the separate intake passages 11, 12 that communicate with the respective combustion chambers for the cylinders of the engine. The valve unit is incorporated in an inlet system of the engine together with the electronic throttle device having a throttle valve in the throttle body. The intake system for the engine is a multiple integral-type intake passage opening/closing device (valve opening/closing device) in which the valve units are arranged inside the intake manifold 2 in parallel at regular intervals in an axial direction (rotation axis direction) of the shaft (pin rod) 4.

As described above, the valve unit of the present embodiment serves as a cartridge that is fit and held in each housing accommodating chamber 15 of the intake manifold 2 by the housing 3, the cantilevered valve and the like. Each housing 3 of the valve units is formed integrally in a predetermined shape from synthetic resin. Each of these housings 3 includes a pair of right and left side wall portions (opposing wall portions or housing right and left wall portions) 21, 22 (see FIG. 2) on its both sides in a horizontal direction perpendicular to the axial direction (intake air flow direction) of the separate intake passage 12. Each of the housings 3 includes a pair of upper and lower wall portions (opposing wall portions or housing upper and lower wall portions) 23, 24 on both sides (upper side and lower side in the direction of gravitational force) in the vertical direction perpendicular to the axial direction (intake air flow direction) of the separate intake passage 12. Each of the housings 3 accommodates the cantilevered valve so as to be opened and closed. Each housing 3 includes a valve accommodating recess 25 for accommodating the cantilevered valve, especially the valve plate 6 and the separator plate 7 when the valve plate 6 of the cantilevered valve is fully opened to the lower side of the separate intake passage 12 in the direction of gravitational force, i.e., outward of a lower surface of the separate intake passage 12 in the direction of gravitational force.

Each of the housing right and left wall portions 21, 22 of the housing 3 includes a pair of shaft bearing holes 26 that open on opposing wall surfaces formed on both sides of the valve accommodating recess 25. These shaft bearing holes 26 penetrate through the housing right and left wall portions 21, 22 of the housing 3 in the rotation axis direction, such that the inside and outside of the housing 3 communicate through the holes 26. The housing right and left wall portions 21, 22 and the housing lower wall portion 24 of each of the housings 3 include a block 27 that defines the separate intake passage 12 on an upstream side of the valve plate 6, on the opposite side of the valve accommodating recess 25 from the cylinder head 1 (on the throttle body side). An end face of the block 27 on the opposite side from the coupling end face of the intake manifold 2 (wall surface of the valve accommodating recess 25 on the throttle body side) is a first stepped surface 31 as a throttle body side stepped surface of the valve accommodating recess 25. This first stepped surface 31 is formed between a lower side wall surface (bottom surface or lower surface) of each separate intake passage 12 in the direction of gravitational force (upper surface of the block 27) and a lower side wall surface (bottom surface or lower surface) of the valve accommodating recess 25 in the direction of gravitational force.

The housing right and left wall portions 21, 22 and the housing lower wall portion 24 of each of the housings 3 include an arc-shaped wall (stepped portion) 29 on the cylinder head side of the valve accommodating recess 25. An end face of the arc-shaped wall 29 on its opposite side from the coupling end face of the cylinder head 1 (wall surface of valve accommodating recess 25 on the cylinder head side) is a second stepped surface 32 as a cylinder head side stepped surface of the valve accommodating recess 25. The second stepped surface 32 is formed between a lower side wall surface (bottom surface or lower surface) of the separate intake passage 12 in the direction of gravitational force and a lower side wall surface (bottom surface or lower surface) of the valve accommodating recess 25 in the direction of gravitational force. Therefore, the housing 3 includes the arc-shaped wall 29 having a cylinder head side wall surface of the valve accommodating recess 25 (second stepped surface 32). Additionally, the second stepped surface 32 serves as a sealing wall surface with respect to a sealing part of the separator plate 7 (described in greater detail hereinafter). The arc-shaped wall 29 is crooked in an arc-shaped manner in cross section. Accordingly, the pressure of intake air on the upstream side of the valve main body 6 of the cantilevered valve easily enters into the downstream side of the valve main body 6 of the cantilevered valve through the pressure introduction passage 34. The arc-shaped wall 29 is formed in a partly cylindrical shape having a concave curved surface (second stepped surface 32) having a curvature radius with a center position of the shaft 4 and the axial direction part 5 being its center. Accordingly, the pressure of intake air on the upstream side of the valve main body 6 of the cantilevered valve easily enters into the downstream side of the valve main body 6 of the cantilevered valve (through the pressure introduction passage 34). A flat plate-shaped partition wall 30 that defines the separate intake passage 12 on the downstream side of the valve plate 6 is formed at an end portion of the circular wall 29.

The housing upper wall portion 23 of the housing 3 includes a reduced portion (clearance) 33, which is defined between the wall portion 23 and an end portion of the valve plate 6 (valve plate upper end portion) on its opposite side from the axial direction part side (rotatable shaft side or rotation center position side) of the valve plate 6 when each valve plate 6 of the cantilevered valves is fully closed. The block 27 of each of the housings 3 includes a pressure introduction passage 34, which is defined between the block 27 and an end portion of the valve plate 6 (valve plate lower end portion) on its axial direction part side (rotatable shaft side or rotation center position side) when each valve plate 6 of the cantilevered valves is fully closed. This pressure introduction passage 34 is formed so as to communicate with a space 45 defined between the valve plate 6 and the separator plate 7 at least when each valve plate 6 of the cantilevered valves is fully closed. Accordingly, the pressure of intake air on the upstream side of each valve plate 6 of the cantilevered valves enters into the space 45 on the downstream side of the valve plate 6 through the pressure introduction passage 34 so as to be applied to the downstream side surface of the valve plate 6.

The shaft 4 of the present embodiment is a metallic shaft extending straightly in a direction perpendicular to a direction parallel to the axial direction of the housing 3 (intake air flow direction), and is inserted by press fitting in a shaft through hole 35 formed for each axial direction part 5 of the cantilevered valves. This shaft 4 is a drive shaft for connecting all the cantilevered valves in synchronization by joining the axial direction parts 5 of the cantilevered valves in a skewered manner. The shaft 4 is a rotatable shaft for changing valve opening degrees of all the valve units (TCV) and is press-fitted and fixed into the inner circumference of the shaft through hole 35 formed for each axial direction part 5 of the cantilevered valves. The shaft 4 is integrally formed from a metallic material. The shaft 4 is inserted in a shaft bearing hole (not shown) of the intake manifold 2 and in the shaft bearing hole 26 of the housing 3 so as to be supported rotatably by the intake manifold 2 and the housing 3. A shaft bearing member such as a ball bearing for rotatably supporting the shaft 4 may be disposed in the shaft bearing hole of the intake manifold 2. A cylindrical shaft bearing member for rotatably supporting the shaft 4 may be press-fitted and fixed in a hole wall surface of the shaft bearing hole 26 of the housing 3.

The cantilevered valves are formed integrally in a predetermined shape from synthetic resin. These cantilevered valves include the cylindrical axial direction parts (cylindrical portions) 5 in a direction perpendicular to the axial direction (intake air flow direction) of each housing 3 (in the rotation axis direction), and are rotary type valves that are joined together so as to be skewered along the shaft 4. Each axial direction part 5 of the cantilevered valves supports and fixes the valve plate 6. The shaft through hole (circular hole) 35 penetrating in the axial direction (rotation axis direction) of the shaft 4 is formed in each axial direction part 5. As described above, each of the cantilevered valves is constituted of the valve plate 6 connected to the axial direction part 5, the separator plate 7 connected to the valve plate 6 and the like.

Rotation angles (valve opening degrees) of the cantilevered valves are changed in the entire valve operation range from the valve fully open position in which a flow of intake air flowing through each separate intake passage 12 of the housings 3 is maximized to the valve fully closed position in which the flow of intake air flowing through each separate intake passage 12 is minimized. Particularly by changing the rotation angle (valve opening degree) of the valve plate 6 having a function as a valve main body in the entire valve operation range from the valve fully open position to the valve fully closed position, the cantilevered valve relatively rotates with respect to the housing 3 so as to open and close the separate intake passage 12. Therefore, a passage sectional area of each separate intake passage 12 is changed. The cantilevered valve serves as a hinge type valve formed such that the center position of the axial direction part 5 is offset to one side in the direction of the valve surface (lower side in FIG. 1) with respect to the center position of the valve plate 6. Accordingly, when each of the cantilevered valves is fully open (see FIG. 4), the valve plate 6 is accommodated (stored) in the valve accommodating recess 25 at the lower part of the housing 3 such that the valve plate 6 and the separator plate 7 do not project into the separate intake passage 12. Thus, intake air resistance and pressure loss of intake air when the cantilevered valves are fully open are reduced.

Each valve plate 6 of the cantilevered valves is a plane plate formed in a square shape or rectangular shape that extends straightly in a linear fashion from the vicinity of the axial direction part 5 to an end portion (valve plate upper end portion: hereafter abbreviated as an upper end portion) 36 of the valve plate 6 on its opposite side from the axial direction part. The upper end portion 36 is formed integrally with each valve plate 6. The reduced portion 33 is defined between the upper end portion 36 and a passage wall surface (upper wall surface) of the housing upper wall portion 23 of the housing 3 when each valve plate 6 of the cantilevered valves is fully closed. This reduced portion 33 has a function of generating gas flowage (swirling flow or tumble flow) in the combustion chamber for each cylinder of the engine by reducing the passage sectional area of each separate intake passage 12 of the housings 3 so as to be a predetermined value or below. By making a passage opening area of the reduced portion 33 smaller, a swirling flow (tumble flow) generated in the combustion chamber for each cylinder of the engine is further intensified.

A valve plate lower end portion (hereafter abbreviated as a lower end portion) 37 formed in a slightly curved shape in cross section is formed integrally with each valve plate 6 at its portion near the axial direction part 5. When each valve plate 6 of the cantilevered valves is fully closed, the pressure introduction passage 34 is defined between the lower end portion 37 and the first stepped surface 31 of each block 27 of the housings 3. A projection portion (air intake guide) 38 that projects in a tangential direction of the axial direction part 5 is formed at the lower end portion 37 of each valve plate 6. This projection portion 38 is located at the lower end portion 37 of each valve plate 6 so as to fill a clearance formed between the first stepped surface 31 of each block 27 of the housings 3 and an upstream side surface of the lower end portion 37 of the valve plate 6 when each valve plate 6 of the cantilevered valves is in a state of the fully opened opening degree. Accordingly, the entering of the intake air flow into the valve accommodating recess 25 and interruption (stagnation) of the intake air when the cantilevered valves are fully open flow are inhibited.

Each separator plate 7 of the cantilevered valves is a curved plate formed in a square shape or rectangular shape that extends, being crooked in an arc-shaped manner from the upper end portion 36 of the valve plate 6 to a rear side in the valve closing direction. Each separator plate 7 is crooked in an arc-shaped manner in cross section so as to be opposed to the second stepped surface 32 with a gap (clearance 43) having a predetermined distance between the separator plate 7 and the second stepped surface 32 of the circular wall 29 of the housing 3. Each separator plate 7 is formed in a partly cylindrical shape having a concave curved surface 42 having the curvature radius with a center position of the shaft 4 and the axial direction part 5 being its center. A sealing part 44 is formed at the end portion of each separator plate 7 (end portion of the separator plate 7 on its opposite side from the upper end portion). A gap (clearance 43) having a predetermined distance is defined between the sealing part 44 and the second stepped surface (sealing wall surface with respect to the separator plate 7) 32 of the circular wall 29 of the housing 3 over the entire valve operation range from the valve fully open position to the valve fully closed position (particularly, at least when each valve plate 6 is fully closed).

At least when each valve plate 6 is fully closed, a space (space formed between the valve plate 6 and the separator plate 7) 45 surrounded with opposing wall surfaces of the housing right and left wall portions 21, 22 of the housing 3, an upper surface of the housing lower wall portion 24 of the housing 3, the downstream side surface of the valve plate 6, and the upstream side surface of the separator plate 7 is divided from the intake passage (separate intake passage 12 and intake port 13) on the downstream side of the cantilevered valve, by the sealing part 44 of each separator plate 7. A side plate connecting one end (left end) of the valve plate 6 in the rotation axis direction and one end (left end) of the separator plate 7 in the rotation axis direction may be provided. A side plate connecting the other end (right end) of the valve plate 6 in the rotation axis direction and the other end (right end) of the separator plate 7 in the rotation axis direction may be provided.

Operations of the intake system for the engine according to the present embodiment, particularly the valve unit are explained briefly with reference to FIG. 1 to FIG. 4. When an ignition switch is turned on (IG-ON), the ECU performs energization control on the electric motor of the electronic throttle device, and drives an ignition system (such as an ignition coil and a spark plug) and a fuel injection system (such as an electric fuel pump and an injector). As a result, the engine is operated. Meanwhile, when a specific cylinder of the engine moves from the exhaust stroke to the intake stroke in which the intake valve opens and the piston descends, negative pressure (pressure lower than atmospheric pressure) in a combustion chamber of this cylinder becomes larger in accordance with the descent of the piston, so that fuel/air mixture is suctioned into the combustion chamber through the intake port 13 which is opened.

When the engine is cooled and the amount of suction air can be small, i.e., when the engine is started or the engine is in idle operation, the ECU controls electric power supplied to the electric motor for the valve units (e.g., energizes the motor). Meanwhile, each valve plate 6 of the cantilevered valves and the shaft 4 are driven in a direction of valve closing operation using driving torque of the electric motor, and accordingly, each valve plate 6 is closed. Thus, valve opening degrees of the valve units are controlled so as to be in a closed state in the valve fully closed position (state of fully closed opening degree). In this case, most of the intake air which has flowed into the housing 3 (separate intake passage 12) through the separate intake passage 11 of the intake manifold 2 is introduced from the inside of the housing 3 (separate intake passage 12) into an upper region of the intake port 13 formed in the cylinder head 1, through the reduced portion (opening) 33 between the passage wall surface of the housing upper wall portion 23 of the housing 3 and the upper end portion 36 of the valve plate 6. Then, the intake air flows along an upper wall surface of the upper region of the intake port 13. After that, the intake air flowing along the upper wall surface of the upper region of the intake port 13 is supplied into the combustion chamber through an intake valve openings (port opening) of the intake port 13. Meanwhile, a swirling flow (tumble flow) is generated in the combustion chamber for each cylinder of the engine. Therefore, combustion efficiency in the combustion chamber when the engine is started or the engine is in idle operation improves, and accordingly, for example, fuel efficiency and emission (e.g., hydrocarbon (HC) reduction effect) improve.

The ECU controls the electric power supplied to the electric motor for the valve units (e.g., energizes the electric motor) when the engine is warmed and a large amount of suction air is needed, i.e., when the engine is in normal operation. Meanwhile, each valve plate 6 of the cantilevered valves and the shaft 4 are driven in a direction of valve opening operation using driving torque of the electric motor, and accordingly, each valve plate 6 is opened. Thus, valve opening degrees of the valve units are controlled so as to be in an open state in the valve fully open position (state of fully opened opening degree). In this case, the intake air which has flowed into the housing 3 (separate intake passage 12)

through the separate intake passage 11 of the intake manifold 2 is introduced from the inside of the housing 3 (separate intake passage 12) into the intake port 13 straight through the inside of the housing 3 (separate intake passage 12). After that, the intake air passing through the intake port 13 is supplied into the combustion chamber through an intake valve openings (port opening) of the intake port 13. Meanwhile, a swirling flow (tumble flow) in the longitudinal direction is not produced in the combustion chamber for each cylinder of the engine.

The cantilevered valve, in which the center position of the shaft 4 and the axial direction part 5 is offset with respect to the center position of the valve plate 6, is employed as the valve body of the intake air flow control valve for producing a swirling flow in the combustion chamber for each cylinder of the engine by rotating relatively with respect to the housing 3 so as to reduce a passage sectional area of the separate intake passages 11, 12 of the intake manifold 2, for the valve unit accommodated in the housing accommodating chamber 15 of the intake manifold 2 of the present embodiment. The valve unit is configured such that the entire cantilevered valve, particularly the valve plate 6 is accommodated in the valve accommodating recess 25 formed outward of the separate intake passage 12 of the housing 3 (on the lower side in the direction of gravitational force) when each valve plate 6 of the cantilevered valves is fully opened.

Accordingly, in the fully open state in which the cantilevered valve is fully opened, i.e., when the cantilevered valve is fully open, the intake air which has flowed into the housing 3 (separate intake passage 12) passes straight through the inside of the housing 3 (separate intake passage 12) without being hindered by the valve plate 6 and the axial direction part 5 of the cantilevered valve. Thus, the intake air which has flowed into the housing 3 (separate intake passage 12) flows straight through the inside of the housing 3 (separate intake passage 12) to be introduced from the inside of the housing 3 (separate intake passage 12) into the combustion chamber for each cylinder of the engine through the intake port 13 of the cylinder head 1. Consequently, when the cantilevered valve is fully open, intake air resistance of intake air passing through the inside of the housing 3 (separate intake passage 12) is reduced.

Advantageous effects of the first embodiment are described below. As described above, for the valve unit of the present embodiment, the cantilevered valve, in which the center position of the shaft 4 and the axial direction part 5 is offset with respect to the center position of the valve plate 6, is adopted as the valve body of the intake air flow control valve for producing a swirling flow in the combustion chamber for each cylinder of the engine. The cantilevered valve includes the valve plate (valve main body) 6 for changing the passage sectional area of the separate intake passage 12 of the housing 3, and the separator plate (valve extension portion) 7 extending in an arc-shaped manner from the upper end portion 36 of the valve plate 6 to a rear side in the valve closing direction. The separator plate 7 includes the sealing part 44, and when the valve plate 6 of the cantilevered valve is fully closed, the clearance 43 is defined between the sealing part 44 and the second stepped surface 32 of the valve accommodating recess 25 of the housing 3. The clearance 43 formed between the sealing part 44 of the separator plate 7 and the second stepped surface 32 of the valve accommodating recess 25 of the housing 3 is set, such that a flow passage (passage) cross-sectional area of the clearance 43 is smaller than the reduced portion 33 formed between the passage wall surface (upper wall surface) of the housing upper wall portion 23 of the housing 3 and the upper end portion 36 of the valve plate 6 when the valve plate 6 of the cantilevered valve is fully closed.

When the valve plate 6 is fully opened while the engine is in normal operation, the valve plate 6 is accommodated in the valve accommodating recess 25 of the housing 3 such that the cantilevered valve does not project into the separate intake passage 12 of the housing 3, i.e., such that the cantilevered valve does not act as intake air resistance. Accordingly, the intake air flow from the separate intake passages 11, 12 on the upstream side of the valve plate 6 toward the separate intake passage 12 and the intake port 13 on the downstream side of the valve plate 6 flows smoothly without being hindered by the valve plate 6 of the cantilevered valve. Therefore, increase in pressure loss of intake air when the valve plate 6 of the cantilevered valve is fully open is limited, and thereby a sufficient amount of intake air is supplied to the combustion chamber for each cylinder of the engine. As a result, reduction of engine output is prevented, so that driveability may be improved.

When the valve plate 6 is fully closed while the engine is started or the engine is in idle operation, the intake air, which has passed through the reduced portion 33 formed between the passage wall surface (upper wall surface) of the housing upper wall portion 23 of the housing 3 and the upper end portion 36 of the valve plate 6, flows from the separate intake passage 12 into the combustion chamber through the intake port 13. As a result of that, the cantilevered valve forms an intense swirling flow (tumble flow) in the combustion chamber for each cylinder of the engine. Meanwhile, the clearance 43, whose flow passage (passage) cross-sectional area is smaller than the reduced portion 33, is formed between the second stepped surface 32 of the valve accommodating recess 25 of the housing 3 and the sealing, part 44 of the separator plate 7. In addition, the pressure introduction passage 34 is formed between the first stepped surface 31 of the block 27 of the housing 3 and the upstream side surface of the lower end portion 37 of the valve plate 6.

Accordingly, the pressure (upstream side pressure) of intake air on the upstream side of the valve plate 6 of the cantilevered valve enters into the space 45 on the downstream side of the valve plate 6 through the pressure introduction passage 34 and the valve accommodating recess 25 so as to be applied to the downstream side surface of the valve plate 6. Therefore, the pressure of intake air applied to the downstream side surface of the valve plate 6 of the cantilevered valve is approximately the pressure (upstream side pressure) of intake air on the upstream side. As a result, a differential pressure between the pressure (=upstream side pressure) applied to the upstream side surface of the valve plate 6 in a thickness direction thereof of the cantilevered valve and the pressure (≈downstream side pressure) applied to the downstream side surface of the valve plate 6 in a thickness direction thereof becomes small. In other words, a front-back differential pressure when the valve plate 6 of the cantilevered valve is fully closed becomes small. Consequently, the generation of rotary torque (bending moment) in the direction of valve opening operation with the shaft 4 as its center due to the front-back differential pressure when the valve plate 6 of the cantilevered valve is fully closed is curbed.

The separator plate 7 of the cantilevered valve is formed in a partly cylindrical shape including a curved surface having a curvature radius with the shaft 4 and the axial direction part 5 as its center. As a result, since the separator plate 7 of the cantilevered valve formed in a partly cylindrical shape is a partly cylindrical portion including the curved surface having a curvature radius with the shaft 4 and the axial direction part 5 as its center, the rotary torque (bending moment) in the direction of valve opening operation with the shaft 4 and the axial direction part 5 as its center is small, even if the force (pressure) applied to the partly cylindrical portion is large. Accordingly, even if the pressure of intake air is applied in a pulsatile fashion to the valve plate 6 of the cantilevered valve, the cantilevered valve does not flap in the separate intake passage 12 of the housing 3, so that opening degree maintenance accuracy in maintaining the valve plate 6 in a state of the fully closed opening degree or in a state of the fully opened opening degree is improved. Therefore, maintaining the valve plate 6 of the cantilevered valve in a state of the fully closed opening degree or in a state of the fully opened opening degree becomes easy. Consequently, holding torque for maintaining (holding) the valve plate 6 of the cantilevered valve in a state of a fully closed opening degree (valve fully closed position) or in a state of a fully opened opening degree (valve fully open position) is decreased. In the result, a size of the actuator including the electric motor is made small, and power consumption of the electric motor is restrained, so that deterioration of fuel efficiency may be limited.

Particularly because the valve plate 6 of the cantilevered valve is maintained (held) in a state of a fully closed opening degree (valve fully closed position), a suction flow, which has passed through the reduced portion 33 formed between the passage wall surface (upper wall surface) of the housing upper wall portion 23 of the housing 3 and the upper end portion 36 of the valve plate 6, flows from the separate intake passage 12 into the combustion chamber through the intake port 13 so as to form an intense swirling flow (tumble flow) in the combustion chamber for each cylinder of the engine. Accordingly, production of a swirling flow (tumble flow) in the combustion chamber for each cylinder of the engine is stabilized, or a swirling flow (tumble flow) in the combustion chamber for each cylinder of the engine is intensified. As a consequence, improvement in combustion efficiency of the engine and improvement in fuel efficiency through the stabilization of combustion are achieved.

Second Embodiment

Figure 5:
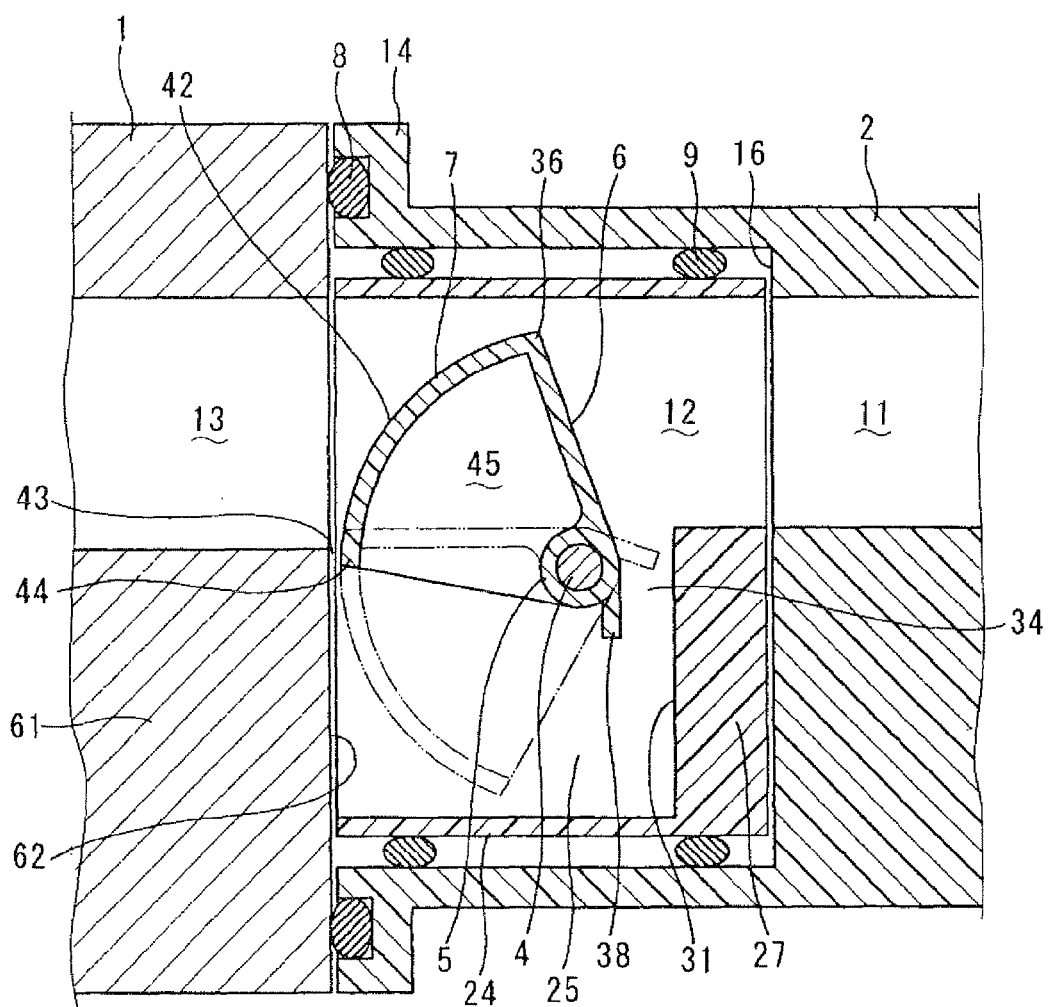
FIG. 5 is a cross-sectional view illustrating an intake system of an internal combustion engine in accordance with a second embodiment of the invention.
Figure 6:
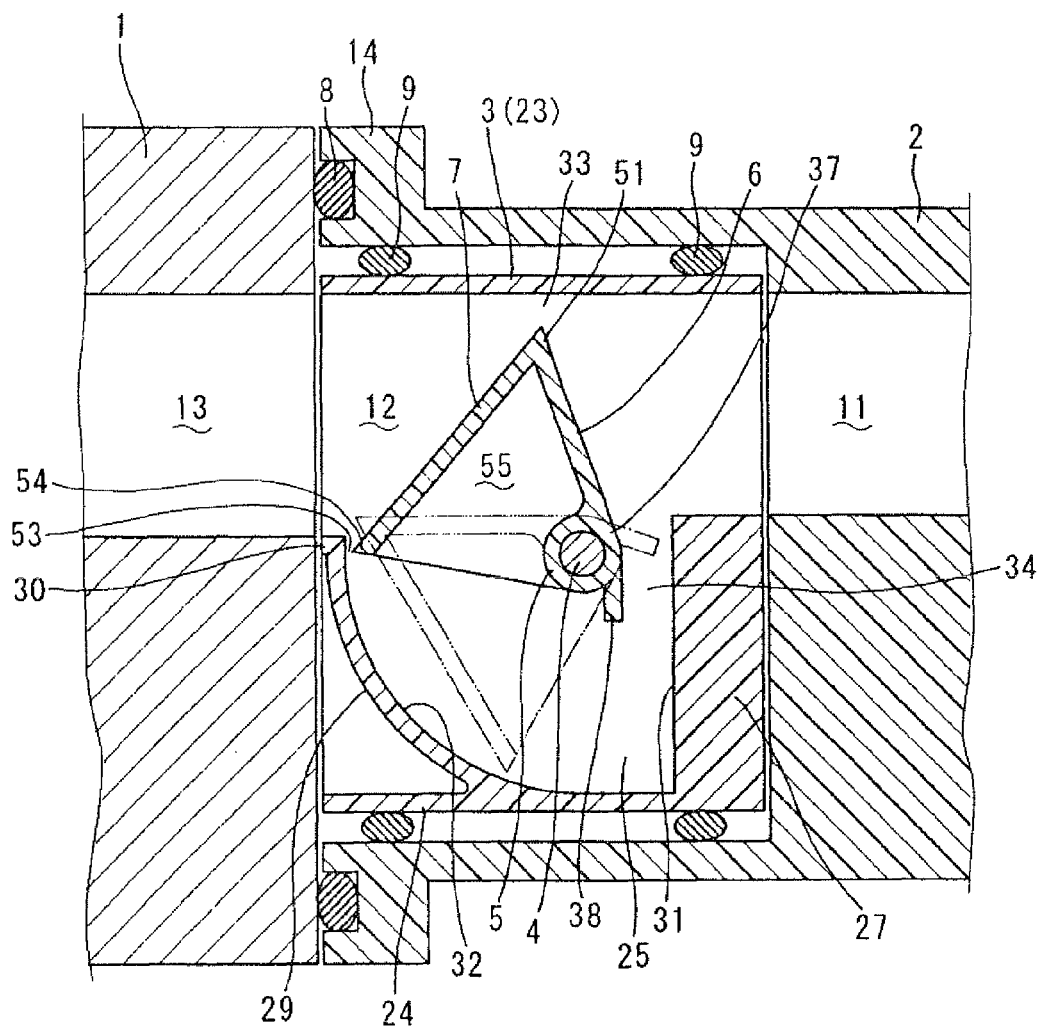
FIG. 6 is a cross-sectional view illustrating an intake system of an internal combustion engine in accordance with a third embodiment of the invention.
Figure 7:
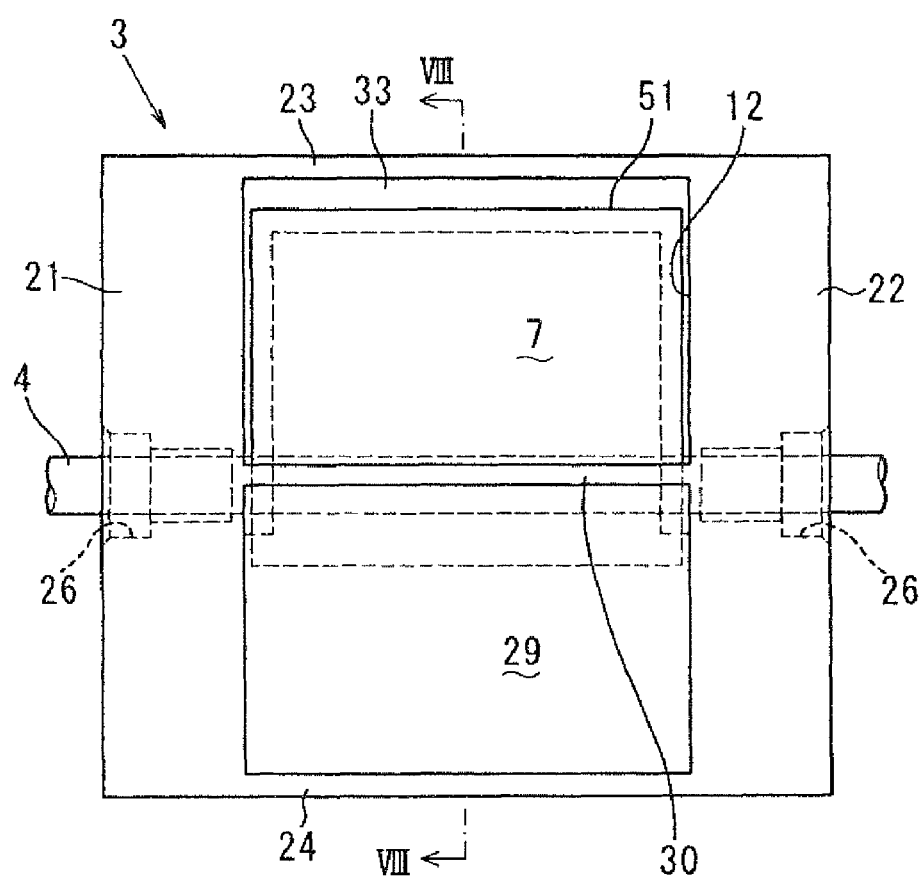
FIG. 7 is a front view illustrating a TCV (valve unit) in accordance with the third embodiment.
Figure 8:
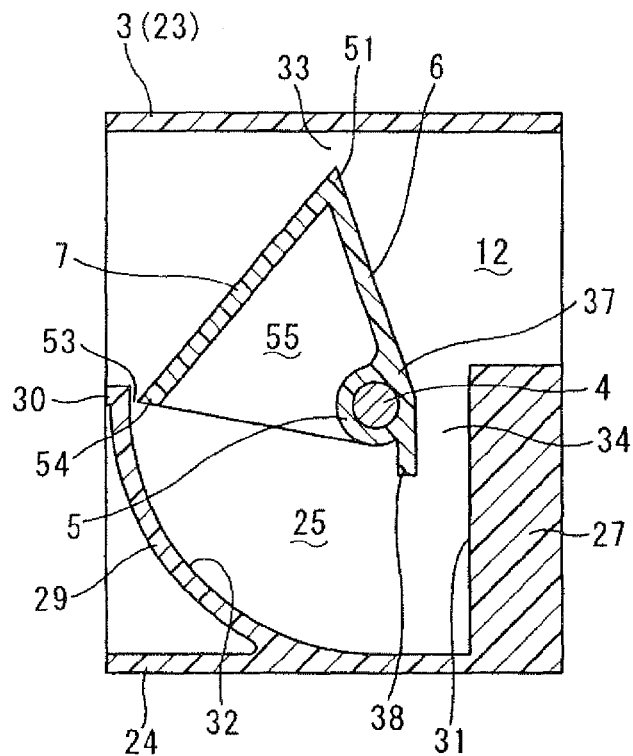
FIG. 8 is a cross-sectional view taken along a line VIII-VIII in FIG. 7 in accordance with the third embodiment.
Figure 9:
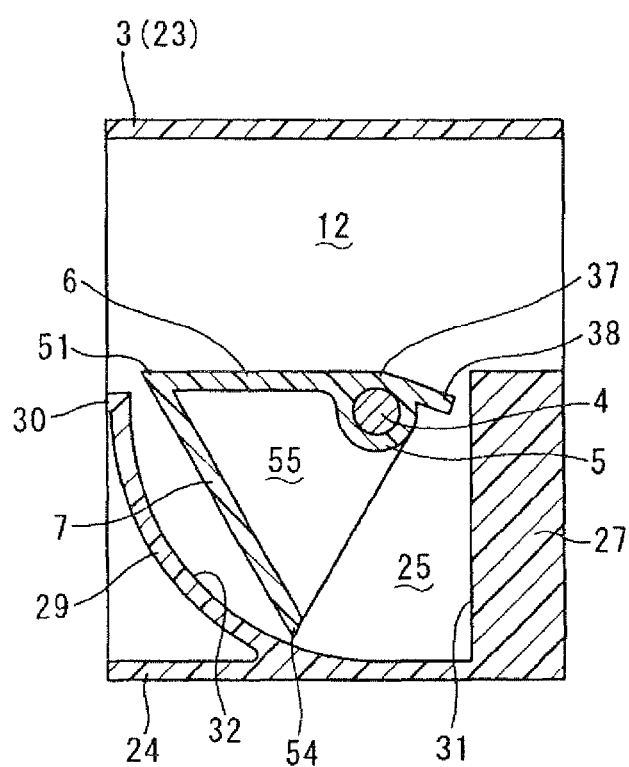
FIG. 9 is a cross-sectional view illustrating the TCV in accordance with the third embodiment.

FIG. 5 illustrates a second embodiment of the invention. A cylinder head (duct) 1 of an engine of the present embodiment includes a coupling end face for fastening an intake manifold 2 using a fastening bolt, for example. A sealing wall surface (stepped surface) 62 with respect to a sealing part 44 of a separator plate 7 of a cantilevered valve is formed on the coupling end face of the cylinder head 1, particularly a coupling end face of a block (stepped portion) 61 on a lower side of an intake port 13 in the direction of gravitational force. Accordingly, at least when a valve plate 6 is fully closed, a gap (clearance 43) having a predetermined distance is formed between the sealing part 44 of the separator plate 7 and the sealing wall surface 62 of the block 61 of the cylinder head 1.

A circular wall 29 is not provided for a housing lower wall portion 24 of a housing 3, and the entire upper surface of the housing lower wall portion 24 serves as a lower side wall surface (bottom surface or lower surface) of a valve accommodating recess 25 in the direction of gravitational force. A coupling end face of the block 61 including the sealing wall surface 62 serves as a cylinder head side stepped surface of the valve accommodating recess 25. The coupling end face of the block 61 is opposed to a first stepped surface 31 of the housing 3 with the valve accommodating recess 25 between the end, face and the surface 31. As described above, a similar effect to the first embodiment is produced by a valve unit according to the present embodiment.

Third Embodiment

FIG. 6 to FIG. 9 illustrate a third embodiment of the invention.

A cantilevered valve according to the present embodiment includes a cylindrical axial direction part (rotatable shaft) 5 that extends straightly in a rotation axis direction of a shaft 4, a valve plate (valve main body) 6 formed in a plate shape that extends straightly in a linear fashion from the vicinity of the axial direction part 5, and a separator plate (valve extension portion) 7 formed in a plate shape that extends straightly in a linear fashion from its connection with the valve plate 6 to a rear side in the valve closing direction. A housing 3 includes a housing upper wall portion 23, and when each valve plate 6 of more than one cantilevered valve is fully closed, a reduced portion (clearance) 33 is defined between the upper wall portion 23 and an end portion of the valve plate 6 (upper end portion of the valve plate 6) on its opposite side from the axial direction part side (rotatable shaft side or rotation center position side) of the valve plate 6. The housing 3 includes a block 27, and when the valve plate 6 of the cantilevered valve is fully closed, a pressure introduction passage 34 is defined between the block 27 and a lower end portion 37 of the valve plate 6. The housing 3 includes a valve accommodating recess 25 for accommodating the valve plate 6 of the cantilevered valve when the valve plate 6 of the cantilevered valve is fully open between a first stepped surface 31 of the block 27 and a second stepped surface 32 of a circular wall 29.

A lower end portion 37 formed in a slightly curved shape in cross section is formed integrally with each valve plate 6 at its portion near the axial direction part 5. When each valve plate 6 of the cantilevered valves is fully closed, the pressure introduction passage 34 is defined between the lower end portion 37 and the first stepped surface 31 of each block 27 of the housings 3. This pressure introduction passage 34 is formed so as to communicate with a space 55 defined between the valve plate 6 and the separator plate 7 at least when each valve plate 6 of the cantilevered valves is fully closed. Accordingly, the pressure of intake air on the upstream side of each valve plate 6 of the cantilevered valves enters into the space 55 on the downstream side of the valve plate 6 through the pressure introduction passage 34 so as to be applied to the downstream side surface of the valve plate 6. A projection portion (air intake guide) 38 that projects in a tangential direction of the axial direction part 5 is formed at the lower end portion 37 of each valve plate 6. The connection that connects the upper end portion of the valve plate 6 and the upper end portion of the separator plate 7 is a flexuous part 51 whose bending angle (internal angle) is an acute angle. Therefore, the cantilevered valve has the flexuous part 51 whose bending angle is an acute angle between the valve plate 6 and the separator plates 7.

A sealing part 54 is formed at the end portion of the separator plate 7 (end portion of the separator plate 7 on its opposite side from the flexuous part). A gap (clearance 53) having a predetermined distance is defined between the sealing part 44 and the second stepped surface 32 of the circular wall 29 of the housing 3 over the entire valve operation range from the valve fully open position to the valve fully closed position (particularly, at least when each valve plate 6 is fully closed). At least when each valve plate 6 is fully closed, a space (space on the downstream side of the valve plate 6) 55 surrounded with opposing wall surfaces of the housing right and left wall portions 21, 22 of the housing 3, an upper surface of the housing lower wall portion 24 of the housing 3, the downstream side surface of the valve plate 6, and the upstream side surface of the separator plate 7 is divided from the intake passage (separate intake passage 12 and intake port 13) on the downstream side of the cantilevered valve, by the sealing part 54 of the separator plate 7. A side plate connecting one end (left end) of the valve plate 6 in the rotation axis direction and one end (left end) of the separator plate 7 in the rotation axis direction may be provided. A side plate connecting the other end (right end) of the valve plate 6 in the rotation axis direction and the other end (right end) of the separator plate 7 in the rotation axis direction may be provided. As described above, a similar effect to the first embodiment is produced by a valve unit according to the present embodiment.

Modifications

In the present embodiments, the intake system for the internal combustion engine according to the invention is configured so as to generate a swirling flow (tumble flow) in the longitudinal direction for promoting combustion of fuel/air mixture in the combustion chamber for each cylinder of the engine. Alternatively, the intake system for the internal combustion engine of the invention may be configured so as to generate a swirling flow (swirl flow) in the cross direction for promoting combustion of fuel/air mixture in the combustion chamber for each cylinder of the engine. Moreover, the intake system for the internal combustion engine of the invention may be configured so as to produce a squish vortex for promoting combustion in the engine.

In the present embodiments, the intake system for the internal combustion engine of the invention is applied to the intake air vortical flow generator. Alternatively, the intake system for the internal combustion engine of the invention may be applied to an electronic throttle device (throttle device of the engine) or to a variable intake system for changing an intake passage length or an intake passage cross-sectional area of the engine. In the present embodiments, the actuator for driving the cantilevered valve via the shaft 4 is configured using the electric motor and the power transmission device (e.g., gear speed reduction mechanism). Alternatively, the actuator for driving the cantilevered valve may be configured using a negative pressure operated actuator having an electromagnetically or electrically-operated vacuum control valve.

Furthermore, an intake air flow control valve for controlling a flow of intake air suctioned into a combustion chamber of an engine that has a valve disposed in an intake passage formed inside a casing such as the air intake duct or the intake manifold 2 and that has a throttle valve disposed in an intake passage formed in a throttle body instead of the valve unit (tumble flow control valve) of the present embodiments as an intake control valve for controlling intake air suctioned into the combustion chamber of the engine, or an intake air flow control valve for controlling a flow of intake air bypassing a throttle valve that has an idle rotational speed control valve disposed in an intake passage formed inside a housing, for example, may be used.

As the intake control valve which is constituted of a duct and a valve, an intake passage opening and closing valve, an intake passage changeover valve, or an intake pressure control valve may be employed instead of the intake air flow control valve or the intake air flow control valve. The intake control valve may be applied to an intake air flow control valve such as the tumble flow control valve (first and second embodiments) or a swirl flow control valve, or an intake air variable valve for changing a passage length or a passage sectional area of an intake passage of an engine, for example.

A Diesel engine may be used as the engine. In addition, not only the multiple cylinder engine but also a single cylinder engine may be employed as the engine.

In the present embodiments, the multiple integral-type valve opening/closing device (intake passage opening/closing device) in which the valve units are arranged inside the intake manifold 2 as a casing at regular intervals in the rotation axis direction of the shaft 4, is used. In each of the valve units, the single cantilevered valve is incorporated into the single housing 3 to be opened and closed. Alternatively, a multiple integral-type valve opening/closing device (intake passage opening/closing device) in which two or more valves are arranged at regular intervals in a rotation axis direction of a shaft directly inside a duct (other air intake ducts, an engine head cover or a cylinder head) may be employed. In such a case, the housing 3 may no longer be required. In the present embodiments, the bearings are used as a shaft bearing member disposed in the shaft bearing hole 26 of the housing 3. Alternatively, other shaft bearing members such as ball bearings may be employed as a shaft bearing member disposed in a shaft bearing hole of a duct.

Additional advantages and modifications will readily occur to those skilled in the art. The invention in its broader terms is therefore not limited to the specific details, representative apparatus, and illustrative examples shown and described.

What is claimed is:
1. An intake system for an internal combustion engine, comprising:
  a duct defining an intake passage inside the duct, wherein intake air is supplied to a combustion chamber of the engine through the intake passage; and
  a cantilevered valve including a plate-like valve main body that opens and closes the intake passage of the duct, a rotatable shaft that supports the valve main body, and a valve extension portion that extends from the valve main body in a valve opening direction of the valve main body, wherein:
    the duct includes:
      a reduced passage portion that is formed between an inner wall of the duct and the valve main body at least when the valve main body is held in a valve fully closed position;
      an accommodating recess that accommodates the valve main body and the valve extension portion at least when the valve main body fully opens the intake passage; and
      a pressure introduction passage that is formed between an inner wall of the duct and the valve main body at least when the valve main body fully closes the intake passage and that communicates with a space between the valve main body and the valve extension portion at least when the valve main body fully closes the intake passage;
    the valve extension portion includes a sealing part, the duct and the sealing part defining therebetween a clearance of predetermined, constant value over an entire valve operation range from a fully open position to a fully closed position of the valve main body; and
    the clearance has a smaller flow passage sectional area than the reduced passage portion.
2. The intake system according to claim 1, wherein the duct further includes a stepped portion, which has a sealing wall surface with respect to the valve extension portion at least when the valve main body fully closes the intake passage.

3. The intake system according to claim 2, wherein the sealing wall surface of the stepped portion is curved generally in an arc.

4. The intake system according to claim 2, wherein a curved surface of the stepped portion is curved generally in an arc, and a center of an imaginary circle including the arc of the curved surface coincides with a center position of the rotatable shaft.

5. The intake system according to claim 1, wherein:
the valve main body is generally planar; and
an outer surface of the valve extension portion is curved generally in an arc that is generally perpendicular to a plane of the valve main body.

6. The intake system according to claim 1, wherein a curved surface of the valve extension portion is curved generally in an arc, and a center of an imaginary circle including the arc of the curved surface coincides with a center position of the rotatable shaft.

7. The intake system according to claim 1, wherein the valve main body is generally planar and the valve extension portion is generally planar.

8. The intake system according to claim 7, wherein an angle between a plane of the valve main body and a plane of the valve extension portion is an acute angle.

9. The intake system according to claim 1, wherein the duct further includes a pair of shaft bearing holes that open respectively on opposing wall surfaces of the accommodating recess, and the rotatable shaft is inserted in the pair of shaft bearing holes and is rotatable relative to the duct.

* * * * *